United States Patent
Bromand

(10) Patent No.: US 11,328,722 B2
(45) Date of Patent: May 10, 2022

(54) SYSTEMS AND METHODS FOR GENERATING A SINGULAR VOICE AUDIO STREAM

(71) Applicant: Spotify AB, Stockholm (SE)

(72) Inventor: Daniel Bromand, Boston, MA (US)

(73) Assignee: Spotify AB, Stockholm (SE)

( * ) Notice: Subject to any disclaimer, the term of this patent is extended or adjusted under 35 U.S.C. 154(b) by 112 days.

(21) Appl. No.: 16/788,067

(22) Filed: Feb. 11, 2020

(65) Prior Publication Data
US 2021/0249006 A1    Aug. 12, 2021

(51) Int. Cl.
*G10L 15/22* (2006.01)
*G06F 3/16* (2006.01)
*H04R 1/24* (2006.01)

(52) U.S. Cl.
CPC .............. *G10L 15/22* (2013.01); *G06F 3/165* (2013.01); *H04R 1/245* (2013.01); *G10L 2015/223* (2013.01)

(58) Field of Classification Search
CPC ....... G10L 15/20; G10L 15/285; G10L 15/08; G10L 15/22; G10L 2015/088; G10L 2015/223; G10L 15/063; G06F 3/167; G06F 3/0481; G06F 1/1643; G06F 3/0412; G06F 3/165; H04M 1/72533; H04R 1/083; H04R 27/00; H04R 1/245
See application file for complete search history.

(56) References Cited

U.S. PATENT DOCUMENTS

| | | | |
|---|---|---|---|
| 9,319,782 B1 | 4/2016 | Crump et al. | |
| 9,361,885 B2 * | 6/2016 | Ganong, III | G10L 15/22 |
| 9,431,021 B1 | 8/2016 | Scalise et al. | |
| 9,443,527 B1 * | 9/2016 | Watanabe | G10L 15/26 |

(Continued)

FOREIGN PATENT DOCUMENTS

| | | |
|---|---|---|
| CN | 108847219 A | 11/2018 |
| CN | 109286875 A | 1/2019 |

(Continued)

OTHER PUBLICATIONS

Bromand, Notice of Allowance, U.S. Appl. No. 16/557,734, dated Apr. 16, 2021, 14 pgs.

(Continued)

*Primary Examiner* — Mohammad K Islam
(74) *Attorney, Agent, or Firm* — Morgan, Lewis & Bockius LLP

(57) ABSTRACT

An electronic device associated with a media-providing service receives a first set of audio streams corresponding to a plurality of microphones. The electronic device generates a second set of audio streams from the first set of audio streams. The second set of audio streams corresponds to a plurality of independent voices and in some cases, ambient noise. The electronic device detects a beginning of a voice command to play media content from the media-providing service in a first audio stream. The electronic device also detects an end of the voice command in the first audio stream. The end of the voice command overlaps with speech in a second audio stream in the second set of audio streams. In response to detecting the voice command, the electronic device plays the media content from the media-providing service.

20 Claims, 9 Drawing Sheets

(56) References Cited

U.S. PATENT DOCUMENTS

| | | |
|---|---|---|
| 9,640,179 B1 | 5/2017 | Hart et al. |
| 9,734,845 B1 | 8/2017 | Liu et al. |
| 9,779,732 B2* | 10/2017 | Lee .................. G06F 1/3293 |
| 9,779,734 B2* | 10/2017 | Lee .................. G10L 15/24 |
| 9,794,710 B1 | 10/2017 | Sheen |
| 9,805,733 B2* | 10/2017 | Park .................. G10L 21/00 |
| 9,916,839 B1 | 3/2018 | Scalise et al. |
| 9,940,949 B1 | 4/2018 | Vitaladevuni et al. |
| 9,947,333 B1 | 4/2018 | David |
| 10,074,371 B1 | 9/2018 | Wang et al. |
| 10,134,388 B1* | 11/2018 | Lilly .................. G10L 15/063 |
| 10,186,266 B1* | 1/2019 | Devaraj .................. G10L 17/06 |
| 10,192,546 B1 | 1/2019 | Piersol et al. |
| 10,229,680 B1* | 3/2019 | Gillespie .................. G06F 40/295 |
| 10,283,116 B2 | 5/2019 | Ko et al. |
| 10,297,266 B1 | 5/2019 | Burenius et al. |
| 10,304,475 B1* | 5/2019 | Wang .................. G01S 3/80 |
| 10,339,957 B1* | 7/2019 | Chenier .................. G10L 25/48 |
| 10,365,887 B1* | 7/2019 | Mulherkar .................. G06F 3/167 |
| 10,438,591 B1* | 10/2019 | Sharifi .................. G10L 17/24 |
| 10,445,365 B2* | 10/2019 | Luke .................. H04L 65/602 |
| 10,515,625 B1* | 12/2019 | Metallinou .................. G10L 15/26 |
| 10,573,312 B1* | 2/2020 | Thomson .................. G10L 15/187 |
| 10,600,406 B1* | 3/2020 | Shapiro .................. G10L 15/22 |
| 10,623,811 B1* | 4/2020 | Cwik .................. H04N 21/4122 |
| 10,643,609 B1* | 5/2020 | Pogue .................. G10L 25/51 |
| 10,685,669 B1* | 6/2020 | Lan .................. G10L 15/1822 |
| 10,706,843 B1* | 7/2020 | Elangovan .................. G10L 15/22 |
| 10,728,196 B2* | 7/2020 | Wang .................. H04L 51/10 |
| 10,847,149 B1* | 11/2020 | Mok .................. G10L 15/08 |
| 10,867,596 B2* | 12/2020 | Yoneda .................. G10L 21/0208 |
| 10,878,826 B2* | 12/2020 | Li .................. G10L 17/22 |
| 2001/0003173 A1* | 6/2001 | Lim .................. G10L 15/20 704/239 |
| 2004/0128135 A1* | 7/2004 | Anastasakos .................. G10L 15/30 704/270.1 |
| 2006/0206340 A1 | 9/2006 | Silvera et al. |
| 2011/0046952 A1* | 2/2011 | Koshinaka .................. G10L 15/063 704/243 |
| 2011/0131032 A1* | 6/2011 | Yang .................. G06F 40/45 704/2 |
| 2013/0013315 A1 | 1/2013 | Burke et al. |
| 2014/0149118 A1* | 5/2014 | Lee .................. G10L 15/22 704/251 |
| 2014/0254816 A1 | 9/2014 | Kim et al. |
| 2014/0278372 A1* | 9/2014 | Nakadai .................. G06F 16/686 704/9 |
| 2014/0303969 A1* | 10/2014 | Inose .................. G10L 15/22 704/231 |
| 2014/0334645 A1* | 11/2014 | Yun .................. G10L 15/22 381/110 |
| 2014/0358535 A1* | 12/2014 | Lee .................. G10L 17/22 704/233 |
| 2015/0006176 A1 | 1/2015 | Pogue et al. |
| 2015/0039317 A1* | 2/2015 | Klein .................. G10L 15/32 704/275 |
| 2015/0058018 A1* | 2/2015 | Georges .................. G10L 15/08 704/257 |
| 2015/0162006 A1 | 6/2015 | Kummer |
| 2015/0296268 A1 | 10/2015 | Lee et al. |
| 2015/0331666 A1 | 11/2015 | Bucsa et al. |
| 2016/0055850 A1* | 2/2016 | Nakadai .................. G10L 15/32 704/235 |
| 2016/0071526 A1 | 3/2016 | Wingate et al. |
| 2016/0077794 A1 | 3/2016 | Kim et al. |
| 2016/0140957 A1* | 5/2016 | Duta .................. G10L 15/063 704/244 |
| 2016/0148615 A1* | 5/2016 | Lee .................. G06F 1/324 704/275 |
| 2016/0156766 A1 | 6/2016 | Nishikawa |
| 2016/0217789 A1* | 7/2016 | Lee .................. G10L 15/32 |
| 2016/0307570 A1 | 10/2016 | Mizumoto et al. |
| 2017/0032244 A1* | 2/2017 | Kurata .................. G06N 3/084 |
| 2017/0053648 A1* | 2/2017 | Chi .................. G10L 15/22 |
| 2017/0053650 A1* | 2/2017 | Ogawa .................. G10L 15/063 |
| 2017/0069321 A1 | 3/2017 | Toiyama |
| 2017/0076720 A1* | 3/2017 | Gopalan .................. G10L 15/22 |
| 2017/0076726 A1* | 3/2017 | Bae .................. G10L 15/22 |
| 2017/0090864 A1* | 3/2017 | Jorgovanovic ...... G10L 21/0332 |
| 2017/0103755 A1* | 4/2017 | Jeon .................. H04L 12/2821 |
| 2017/0242651 A1 | 8/2017 | Lang et al. |
| 2017/0300990 A1* | 10/2017 | Tanaka .................. G10L 15/08 |
| 2018/0012593 A1 | 1/2018 | Prasad et al. |
| 2018/0033428 A1* | 2/2018 | Kim .................. G10L 15/22 |
| 2018/0122378 A1 | 5/2018 | Mixter et al. |
| 2018/0165055 A1 | 6/2018 | Yu et al. |
| 2018/0182383 A1* | 6/2018 | Kim .................. G06N 3/0445 |
| 2018/0182397 A1* | 6/2018 | Carbune .................. G10L 15/22 |
| 2018/0188948 A1* | 7/2018 | Ouyang .................. G06F 3/0233 |
| 2018/0190264 A1 | 7/2018 | Mixter |
| 2018/0211665 A1* | 7/2018 | Park .................. G06F 3/167 |
| 2018/0211666 A1 | 7/2018 | Kolavennu |
| 2018/0233136 A1 | 8/2018 | Torok et al. |
| 2018/0233137 A1 | 8/2018 | Torok et al. |
| 2018/0233142 A1* | 8/2018 | Koishi .................. G01S 5/28 |
| 2018/0286394 A1* | 10/2018 | Li .................. G10L 17/24 |
| 2018/0286414 A1* | 10/2018 | Ravindran .................. G10L 25/24 |
| 2018/0286433 A1* | 10/2018 | Hicks .................. H04R 1/406 |
| 2018/0324536 A1 | 11/2018 | Drinkwater et al. |
| 2018/0349093 A1* | 12/2018 | McCarty .................. H04L 12/282 |
| 2019/0051298 A1* | 2/2019 | Lee .................. H04M 1/72403 |
| 2019/0073999 A1 | 3/2019 | Premont et al. |
| 2019/0074014 A1 | 3/2019 | Wilberding |
| 2019/0081810 A1* | 3/2019 | Jung .................. G10L 15/30 |
| 2019/0087455 A1* | 3/2019 | He .................. G06F 40/253 |
| 2019/0096419 A1 | 3/2019 | Giacobello |
| 2019/0115018 A1 | 4/2019 | Zurek et al. |
| 2019/0124388 A1 | 4/2019 | Schwartz |
| 2019/0206391 A1* | 7/2019 | Busch .................. G10L 15/16 |
| 2019/0237067 A1* | 8/2019 | Friedman .................. G10L 15/22 |
| 2019/0244608 A1* | 8/2019 | Choi .................. G10L 15/08 |
| 2019/0251960 A1 | 8/2019 | Maker et al. |
| 2019/0295542 A1* | 9/2019 | Huang .................. G10L 15/30 |
| 2019/0320260 A1 | 10/2019 | Alders et al. |
| 2019/0348044 A1* | 11/2019 | Chun .................. G06N 3/004 |
| 2019/0355365 A1 | 11/2019 | Kim et al. |
| 2019/0362714 A1* | 11/2019 | Mori .................. G10L 15/08 |
| 2020/0066271 A1 | 2/2020 | Li et al. |
| 2020/0074990 A1* | 3/2020 | Kim .................. G10L 17/18 |
| 2020/0074995 A1 | 3/2020 | Rosenberg |
| 2020/0098354 A1* | 3/2020 | Lin .................. G10L 15/22 |
| 2020/0105245 A1* | 4/2020 | Gupta .................. G10L 13/033 |
| 2020/0105264 A1* | 4/2020 | Jang .................. G06F 3/0485 |
| 2020/0211539 A1* | 7/2020 | Lee .................. G10L 21/0208 |
| 2020/0211550 A1* | 7/2020 | Pan .................. G10L 15/063 |
| 2020/0219493 A1* | 7/2020 | Li .................. G10L 15/22 |
| 2020/0221180 A1 | 7/2020 | Pletsch et al. |
| 2020/0234709 A1* | 7/2020 | Kunitake .................. G10L 15/22 |
| 2020/0265838 A1* | 8/2020 | Lee .................. G06F 1/3287 |
| 2020/0310751 A1* | 10/2020 | Anand .................. H04R 1/1041 |
| 2020/0357374 A1 | 11/2020 | Verweij et al. |
| 2020/0367006 A1 | 11/2020 | Beckhardt |
| 2020/0374269 A1 | 11/2020 | Lidman |
| 2020/0402490 A1 | 12/2020 | Duthaler |
| 2021/0067867 A1* | 3/2021 | Kagoshima ......... G10L 21/0208 |
| 2021/0349982 A1 | 11/2021 | Frederickson et al. |

FOREIGN PATENT DOCUMENTS

| | | | |
|---|---|---|---|
| CN | 109741755 A | 5/2019 | |
| DK | 201770421 A1 | 12/2018 | |
| EP | 2965496 A1 | 1/2016 | |
| EP | 3133595 A1 * | 2/2017 | ............ G10L 15/32 |
| EP | 2965496 B1 | 1/2018 | |
| EP | 3306892 A1 | 4/2018 | |
| WO | WO2017/197184 A1 | 11/2017 | |
| WO | WO2018/211983 A1 | 11/2018 | |
| WO | WO2018/236952 A1 | 12/2018 | |
| WO | WO2019034083 A1 | 2/2019 | |
| WO | WO2019046173 A1 | 3/2019 | |

(56) References Cited

FOREIGN PATENT DOCUMENTS

| WO | WO2019/160787 A1 | 8/2019 |
| WO | WO2019222996 A1 | 11/2019 |

OTHER PUBLICATIONS

Bromand, Office Action, U.S. Appl. No. 16/787,993, dated Jun. 14, 2021, 23 pgs.
Spotify AB, Extended European Search Report, EP20178734.8, dated Nov. 26, 2020, 10 pgs.
Spotify AB, Extended European Search Report, EP20179016.9, dated Aug. 14, 2020, 7 pgs.
Spotify AB, Extended European Search Report, EP20217407.4, dated Jun. 17, 2021, 27 pgs.
Bromand, Notice of Allowance, U.S. Appl. No. 16/562,318, dated Jun. 29, 2020, 9 pgs.
Spotify AB, Extended European Search Report, EP20170208.1, dated Oct. 9, 2020, 6 pgs.
Bingham, "A fast fixed-point algorithm for independent component analysis of complex valued signals," Neural Networks Research Centre, Helsinki University of Technology, Finland, Jan. 19, 2000, 16 pgs.
E&T Engineering and Technology, "Amazon proposes bundling multiple virtual assistants in a single device," Sep. 25, 2019, downloaded from https://eandt.theiet.org/content/articles/2019/amazon-proposes-bundling-multiple-virtual-assistnts-in-a-single-device/, 4 pgs.
Saruwatari, "Blind Source Separation Combining Independent Component analysis and Beamforming," EURASIP Journal on Applied Signal Processing 2003:11, 1135-1146, © 2003 Hindawi Publishing Corporation, 12 pgs.
Bromand, Notice of Allowance, U.S. Appl. No. 16/787,993, dated Dec. 15, 2021, 9 pgs.
Bromand, Office Action, U.S. Appl. No. 17/033,326, dated Dec. 24, 2021, 10 pgs.
Ragno R, et al., "Inferring similarity between music objects with application to playlist generation," Multimedia Information Retrieval, ACM, 2 Penn Plaza, Suite 701, New York, NY 10121-0701 USA, Nov. 10, 2005, pp. 73-80, XP058245557.
Spotify AB, Communication Pursuant to Article 94(3), EP19163047.4, dated Feb. 28, 2022, 9 pgs.
Spotify AB, Communication Pursuant to Article 94(3), EP20170208.1, dated Feb. 11, 2022, 5 pgs.

* cited by examiner

SYSTEMS AND METHODS FOR GENERATING A SINGULAR VOICE AUDIO STREAM

TECHNICAL FIELD

The disclosed embodiments relate generally to media playback, and, in particular, to generating an audio stream for a singular speaker (an individual) from an audio stream of mixed speakers (e.g., two or more people speaking).

BACKGROUND

Access to electronic media, such as music and video content, has expanded dramatically over time. As a departure from physical media, media content providers stream media to electronic devices across wireless networks, improving the convenience with which users can digest and experience such content.

Some devices are enabled to receive voice commands as a means of controlling media playback. However, when multiple people are speaking at the same time, the device receiving the voice command may also receive audio input unrelated to the voice command. Thus, multiple speakers can make it difficult for a device to accurately identify and interpret voice commands from a single speaker.

SUMMARY

There is a need for systems and methods of detecting voice commands from a single speaker, even in situations in which multiple people are speaking at the same time. Consider, as an example, three people in a living room. Two of which may be talking to each other when the third person instructs an electronic device to perform an action using a voice command. The conversation between the two people and the voice command are all detected by the electronic device, making it difficult for the device to detect a voice command, as well as determine when that voice command starts and ends.

Note that this technical problem is further exacerbated by the fact that any of the multiple people could utter the voice command (e.g., wake word) and the fact that the length of the voice command may not be known a priori. For example, a person may provide a general command to play music, such as "Hey Spotify, play" (e.g., where "Hey Spotify" is the so-called "wake word" for the electronic device), while other people in the room talk about a musical artist. If the electronic device were to only detect content, and not separate the sources of that content, it would be difficult for the electronic device to determine that the word "play" ended the speech command.

Some embodiments described herein offer a technical solution to these problems by generating, from an audio stream of the multiple people, an audio stream of a single person (a so-called singular voice audio stream) that is instructing the electronic device to perform the voice command (e.g., by performing blind separation of sources in speech signals in order to detect a voice command, such as a wake word). In some embodiments, the audio stream for the single person is generated by a client device (the electronic device) and, subsequently, a portion of the audio stream for the single person (and not the remainder of the audio from the multiple people) is provided to a server to interpret the voice command. The electronic device then performs the action in accordance with the voice command. Generating singular voice audio streams thus reduces incorrect detection of voice commands or missed detection of voice commands, which in turn increases the operability of the devices and reduces the amount of processing power required for detecting and interpreting voice commands. By improving the accuracy of detecting voice commands (e.g., as inputs from a user), the performance of the device is improved by allowing faster recognition of user inputs and reducing the processing load of the device when performing voice command recognition.

Further, in some embodiments, the methods and devices described herein provide a more seamless experience by recognizing voice commands that follow immediately after a user utters a wake word (e.g., without a pause in speech). At the same time, because many users are accustomed to pausing after uttering a wake word, some embodiments provide an audible or visible acknowledgment of the wake word when the user does pause. For example, a user wishes to play a song on a device during a party. The user utters "Hey, Spotify, play Madonna" in a crowded room. Typically, while uttering this command, the user pauses in between "Hey Spotify" and "play Madonna" to verify that the device is in fact listening to the command. Especially in a crowded room, the user is likely to double check that the device is able to hear the user and interpret the voice command. This type of interrupted speech is inconvenient and clumsy when a user wants the command to be performed with as little friction as possible. A voice command may take upwards of several seconds to be heard, processed, and performed. Some embodiments described herein allow users to continue speaking voice commands with a pause in between the wake word "Hey Spotify" and the command "play Madonna" or to seamlessly instruct "Hey Spotify, play Madonna" with minimal latency in performance of the command.

To that end, in accordance with some embodiments, a method is performed at an electronic device associated with a media-providing service (e.g., a server for the media-providing service or a client device logged into the media-providing service). The electronic device includes one or more processors and memory storing instructions for execution by the one or more processors. The method includes receiving a first set of audio streams corresponding to each of a plurality of microphones. The method further includes generating, from the first set of audio streams, a second set of audio streams corresponding to each of a plurality of independent voices. The method further includes detecting, in a first audio stream of the second set of audio streams, a beginning of a voice command to play media content from the media-providing service and an end of the voice command. The end of the voice command overlaps with speech in a second audio stream of the second set of audio streams. In response to detecting the voice command, the method further includes playing the media content from the media-providing service.

In accordance with some embodiments, an electronic device (e.g., a server for a media-providing service or a client device logged into the media-providing service) includes one or more processors and memory storing one or more programs configured to be executed by the one or more processors. The one or more programs include instructions for receiving a first set of audio streams corresponding to each of a plurality of microphones and generating a second set of audio streams from the first set of audio streams that corresponds to each of a plurality of independent voices. The one or more programs also include instructions for detecting, in a first audio stream of the second set of audio streams, a beginning of a voice command to play media content from the media-providing service and an end of the voice command. The end of the voice command overlaps with speech in a second audio stream of the second set of audio streams. The one or more programs also include instructions for playing, in response to detecting the voice command, the media content from the media providing service.

In accordance with some embodiments, a computer-readable storage medium has stored therein instructions that, when executed by an electronic device (e.g., a server for the media-providing service or a client device logged into the media-providing service), cause the electronic device to receive a first set of audio streams corresponding to each of a plurality of microphones and generate a second set of audio streams from the first set of audio streams that corresponds to each of a plurality of independent voices. The instructions further cause the electronic device to detect, in a first audio stream of the second set of audio streams, a beginning of a voice command to play media content from the media-providing service and an end of the voice command. The end of the voice command overlaps with speech in a second audio stream of the second set of audio streams. The instructions further cause the electronic device to play, in response to detecting the voice command, the media content from the media-providing service.

Thus, systems are provided with improved methods for detecting voice commands and, more particularly, for detecting an end to a voice command.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc., are, in some instances, used herein to describe various elements, these elements should not be limited by these terms. These terms are used only to distinguish one element from another. For example, a first set of audio streams could be termed a second set of audio streams, and, similarly, a second set of audio streams could be termed a first set of audio streams, without departing from the scope of the various described embodiments. The first set of audio streams and the second set of audio streams are both sets of audio streams, but they are not the same set of audio streams. Additionally, the terms audio stream and audio signal are used herein interchangeably.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
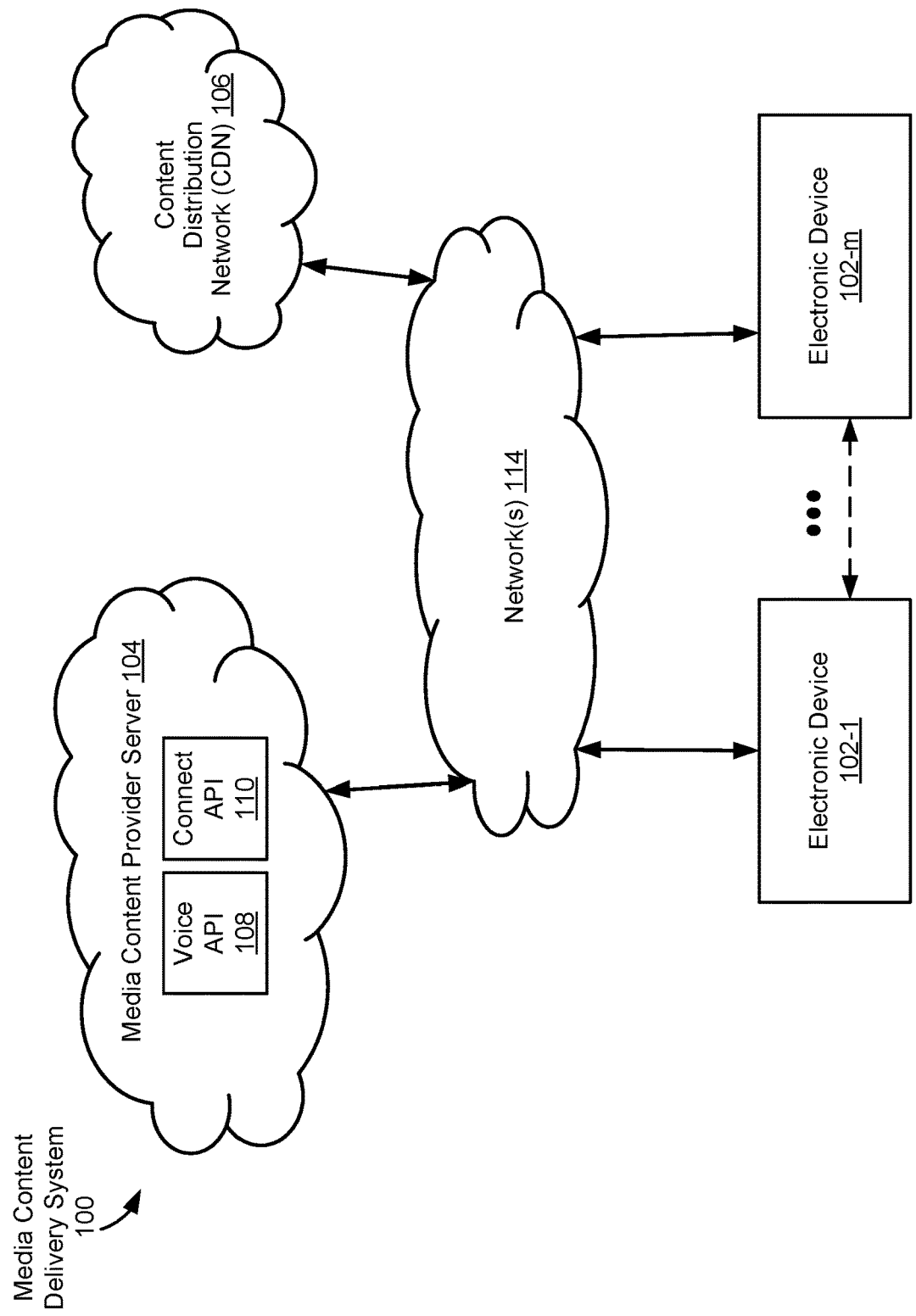
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content provider servers 104, and/or one or more content delivery networks (CDNs) 106. The one or more media content provider servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content provider servers 104. One or more networks 114 communicably couple the components of the media content delivery system 100. In some embodiments, the one or more networks 114 include public communication networks, private communication networks, or a combination of both public and private communication networks. For example, the one or more networks 114 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices. In some embodiments, electronic device 102-1 (e.g., or electronic device 102-2 (not shown)) includes a plurality (e.g., a group) of electronic devices. For example, electronic device 102-2 comprises two or more speakers (e.g., or a combination of two or more electronic devices, such as a speaker, a TV, and a smart phone). In some embodiments, the two or more speakers are communicatively coupled to each other (e.g., to synchronize playback over the two or more speakers). In some embodiments, electronic device 102 includes a smart microphone (e.g., an electronic device having one or more microphones (or an array comprising a plurality of microphones) running a virtual digital assistant or coupled to another device running a virtual digital assistant). In some embodiments, the electronic device 102 is a smart microphone and/or speaker within an automobile stereo system. Further, the term "speaker," as used herein, is intended to include smart speakers running a virtual digital assistant configured to recognize voice commands using one or more microphones running on the smart speaker.

In some embodiments, electronic devices 102-1 and 102-m send and receive media-control information through network(s) 114. For example, electronic devices 102-1 and 102-m send media control requests (e.g., requests to play music, spoken word, podcasts, news, talk shows, books, or other media items (e.g., media items that include audio content), or playlists thereof) to media content provider server 104 through network(s) 114. Additionally, electronic devices 102-1 and 102-m, in some embodiments, also send indications of media content items to media content provider server 104 through network(s) 114. In some embodiments, the media content items are uploaded to electronic devices 102-1 and 102-m before the electronic devices forward the media content items to media content provider server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., Bluetooth, Bluetooth Low Energy (BLE), TCP/UDP over LAN) communication technologies, radio-frequency-based near-field communication technologies, infrared communication technologies, etc.) with electronic device 102-m. In some embodiments, electronic device 102-1 communicates with electronic device 102-m through network(s) 114. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content provider server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content provider server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102. In some embodiments, the CDN 106 sends media content to the electronic device(s) 102 in response to receiving a request (e.g., from one or more electronic device(s) 102 and/or from media content provider server 104).

In some embodiments, the CDN 106 stores and provides media content (e.g., media content requested by the media application 222 of electronic device 102) to electronic device 102 via the network(s) 114. Content (also referred to herein as "media items," "media content items," and "content items") is received, stored, and/or served by the CDN 106. In some embodiments, content includes audio (e.g., music, spoken word, podcasts, news, talk shows, books, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content provider server 104 receives media requests (e.g., commands) from electronic devices 102. In some embodiments, media content provider server 104 includes a voice application programming interface (API) 108 (e.g., voice recognition module 316, FIG. 3) and connect API 110 (e.g., network communication module 312, FIG. 3).

In some embodiments, media content provider server 104 and/or CDN 106 stores one or more playlists (e.g., information indicating a set of media content items that may include albums, tracks, podcast episodes, podcast shows, etc.). For example, a playlist is a set of media content items defined by a user and/or defined by an editor associated with a media-providing service. The description of the media content provider server 104 as a "server" is intended as a functional description of the devices, systems, processor cores, and/or other components that provide the functionality attributed to the media content provider server 104. It will be understood that the media content provider server 104 may be a single server computer, or may be multiple server computers. Moreover, the media content provider server 104 may be coupled to CDN 106 and/or other servers and/or server systems, or other devices, such as other client devices, databases, content delivery networks (e.g., peer-to-peer networks), network caches, and the like. In some embodiments, the media content provider server 104 is implemented by multiple computing devices working together to perform the actions of a server system (e.g., cloud computing).

Figure 2:
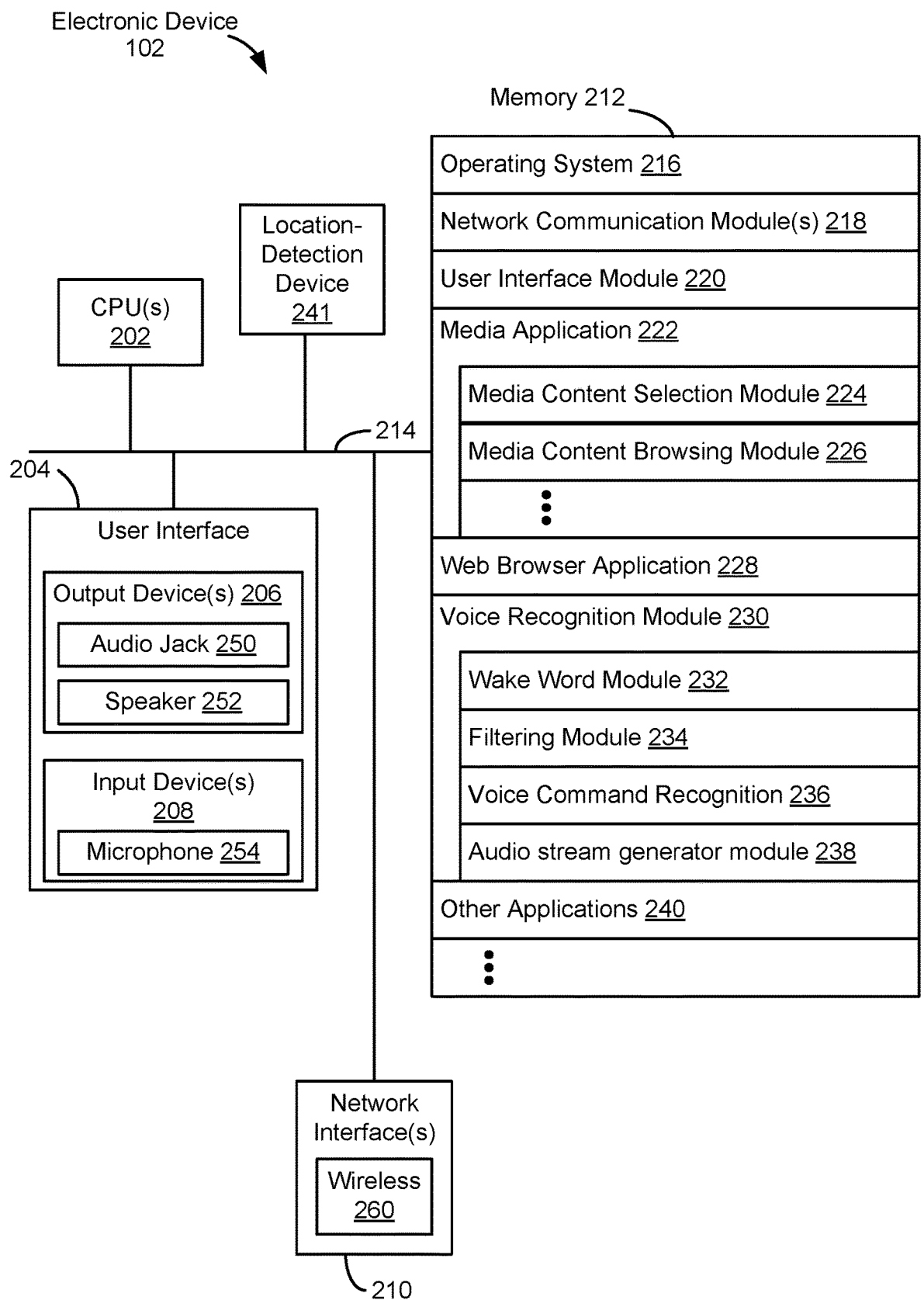
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 241, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content provider server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile or other accessories). Furthermore, in some embodiments, the wireless interface 260 (or a different communications interface of the one or more network interfaces 210) enables data communications with other WLAN-compatible devices (e.g., electronic device(s) 102) and/or the media content provider server 104 (via the one or more network(s) 114, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Figure 8A:
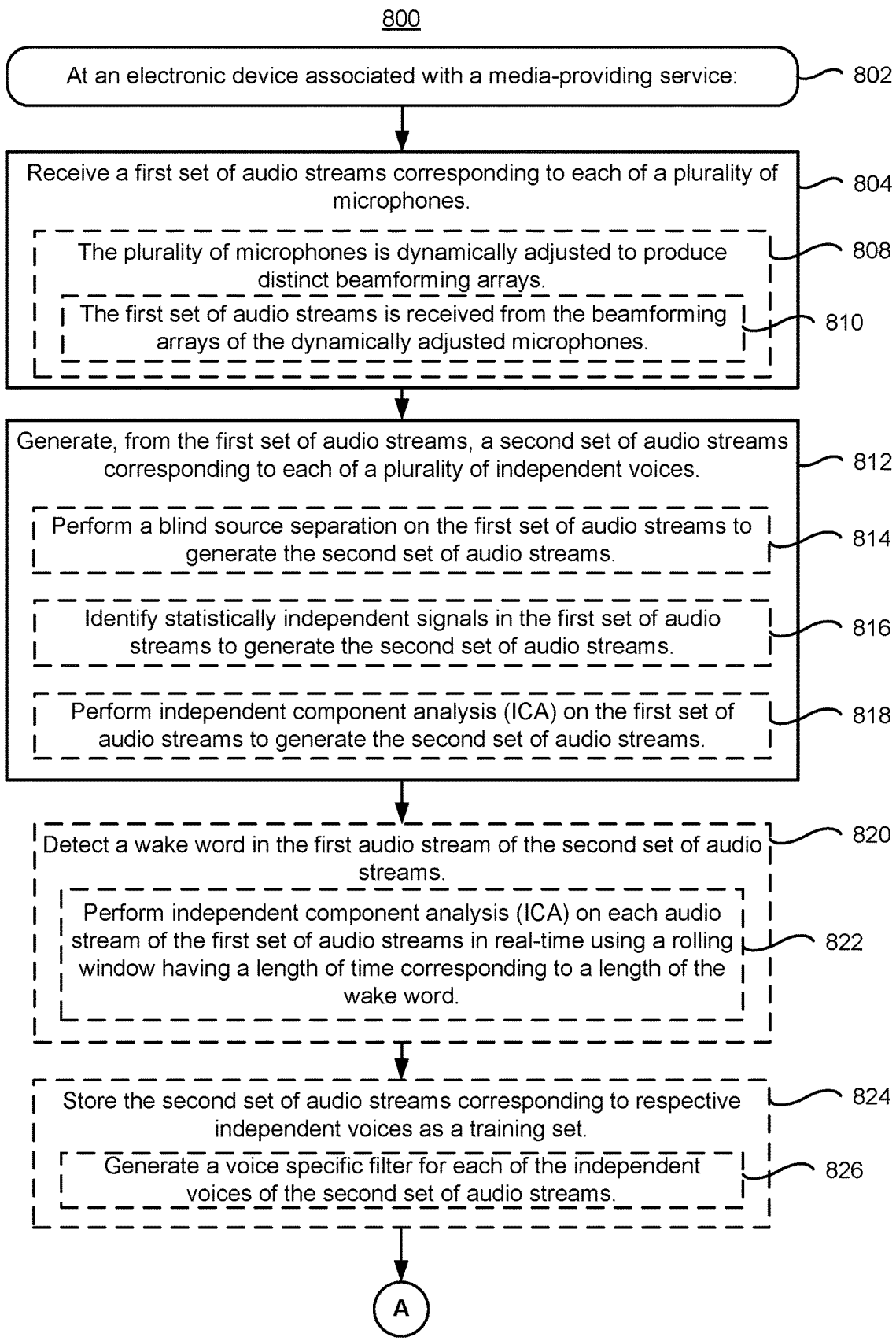
FIGS. 8A-8B are flow diagrams illustrating a method of generating a singular voice audio stream, in accordance with some embodiments.
Figure 8B:
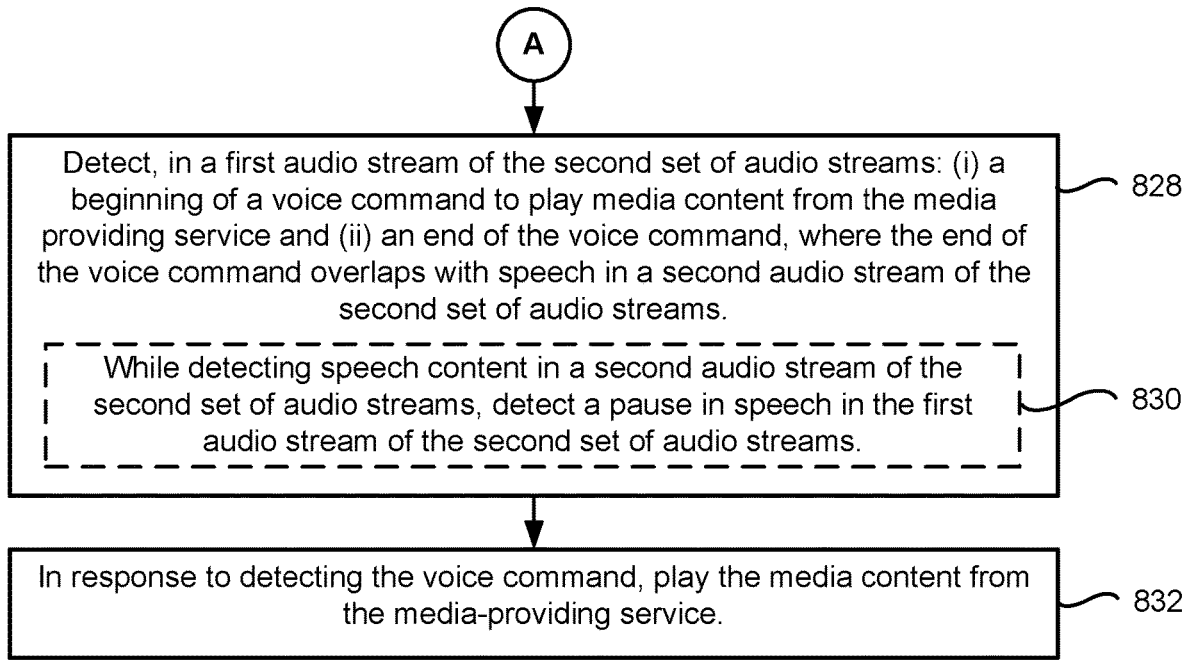

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content provider server 104) via the one or more network interface(s) 210 (wired or wireless) connected to one or more network(s) 114;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content provider server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content provider server 104) data associated with user behavior. In some embodiments, media application 222 also includes the following modules (or sets of instructions), or a subset or superset thereof:
  - a media content selection module 224 for selecting one or more media content items and/or sending, to the media content provider server, an indication of the selected media content item(s); and
  - a media content browsing module 226 for providing controls and/or user interfaces enabling a user to navigate, select for playback, and otherwise control or interact with media content, whether the media content is stored or played locally or remotely.
- a web browser application 228 (e.g., Internet Explorer or Edge by Microsoft, Firefox by Mozilla, Safari by Apple, and/or Chrome by Google) for accessing, viewing, and/or interacting with web sites;

a voice recognition module 230 for identifying and/or interpreting one or more voice commands received at the electronic device 102, the voice recognition module 230 including, but not limited to, one or more of:

- a wake word module 232 for determining whether a wake word has been received at the electronic device 102. In some embodiments, the wake word is used to identify (e.g., delimit) a voice command that follows the wake word (e.g., after the wake word is received, the electronic device records additional voice commands). In some embodiments, wake word module 232 includes instructions for performing portions of method 800 (FIGS. 8A-8B). In some embodiments, wake word module 232 detects a wake word in a singular voice audio stream, generated in accordance with method 800 (FIGS. 8A-8B). Note that, in some embodiments, similar functionality can be triggered by pressing an input button on the device (e.g., the user can either utter the wake word or press the input button to cause the device to listen for a voice command);
- a filtering module 234 for performing various filtering of audio to reduce and/or eliminate ambient noise;
- a voice command recognition module 236 for recognizing and performing actions based on a voice command input. In some embodiments, voice command recognition module 236 includes instructions for performing method 800 (FIGS. 8A-8B);
- an audio stream generator 238 for separating a first set of audio streams corresponding to each of a plurality of microphones into a second set of audio streams corresponding to each of a plurality of independent voices (or ambient noise). As noted through, in some embodiments, the wake word, and a beginning and end of a voice command that follows the wake word, is detected in a respective one of the audio streams in the second set of audio streams In some embodiments, audio stream generator 238 includes instructions for performing portions of method 800 (FIGS. 8A-8B); and
- other applications 240, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
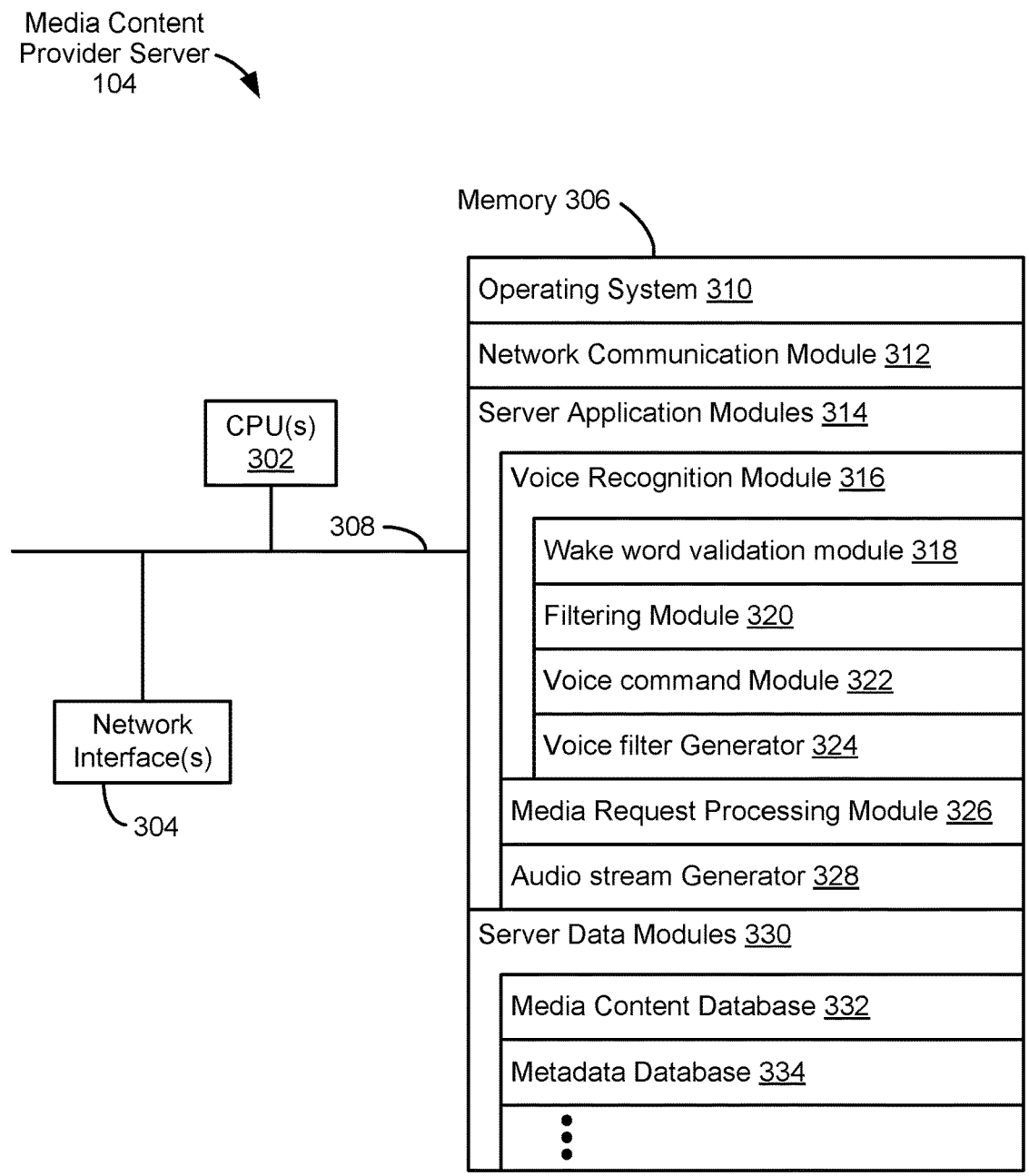
FIG. 3 is a block diagram illustrating a media content provider server, in accordance with some embodiments.

FIG. 3 is a block diagram illustrating a media content provider server 104, in accordance with some embodiments. The media content provider server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content provider server 104 to other computing devices via one or more network interfaces 304 (wired or wireless) connected to one or more networks 114;
- one or more server application modules 314 for performing various functions with respect to providing and managing a content service, the server application modules 314 including, but not limited to, one or more of:
  - a voice recognition module 316 for identifying and/or interpreting one or more voice commands received at an electronic device, the voice recognition module 316 including, but not limited to, one or more of the following (note that voice recognition module 316, or any of the sub-modules of voice recognition module 316, may include instructions for performing method 800 (FIGS. 8A-8B):
    - a wake word module 318 for verifying whether a wake word has been received at the electronic device (e.g., after wake word module 232 of client device 102 has made an initial determination that the wake word has been uttered). In some embodiments, the wake word is used to identify (e.g., delimit) a voice command that follows the wake word (e.g., after the wake word is received, the electronic device records additional voice commands);
    - a filtering module 320 similar to filtering module 234 of FIG. 2, for applying various filters to audio streams to reduce and/or eliminate ambient noise;
    - a voice command module 322 interpreting and processing voice commands that follow a wake word; and
    - a voice filter generator 324 for generating user-specific voice filters after performing blind source separation (e.g., as described with reference to method 800, FIGS. 8A-8B);
  - a media request processing module 326 for processing requests for media content and facilitating access to requested media items by electronic devices (e.g., the electronic device 102) including, optionally, streaming media content to such devices;
  - an audio stream generator 328 for processing (e.g., identifying and/or providing to the electronic device) timing information related to playback of a media content item;
- one or more server data module(s) 330 for handling the storage of and/or access to media items and/or metadata relating to the media items; in some embodiments, the one or more server data module(s) 330 include:
  - a media content database 332 for storing media items;
  - a metadata database 334 for storing metadata relating to the media items; and
  - a key database 336 for storing keys related to account information for user media accounts, such as user profiles, credentials (e.g., user identifiers, passwords, email addresses, etc.), and/or identifiers of any linked accounts.

In some embodiments, the media content provider server 104 includes web or Hypertext Transfer Protocol (HTTP)

servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content provider server 104 in accordance with some embodiments, FIG. 3 is intended more as a functional description of the various features that may be present in one or more media content provider servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content provider server 104. The actual number of servers used to implement the media content provider server 104, and how features are allocated among them, will vary from one implementation to another and, optionally, depends in part on the amount of data traffic that the server system handles during peak usage periods as well as during average usage periods.

Figure 4:
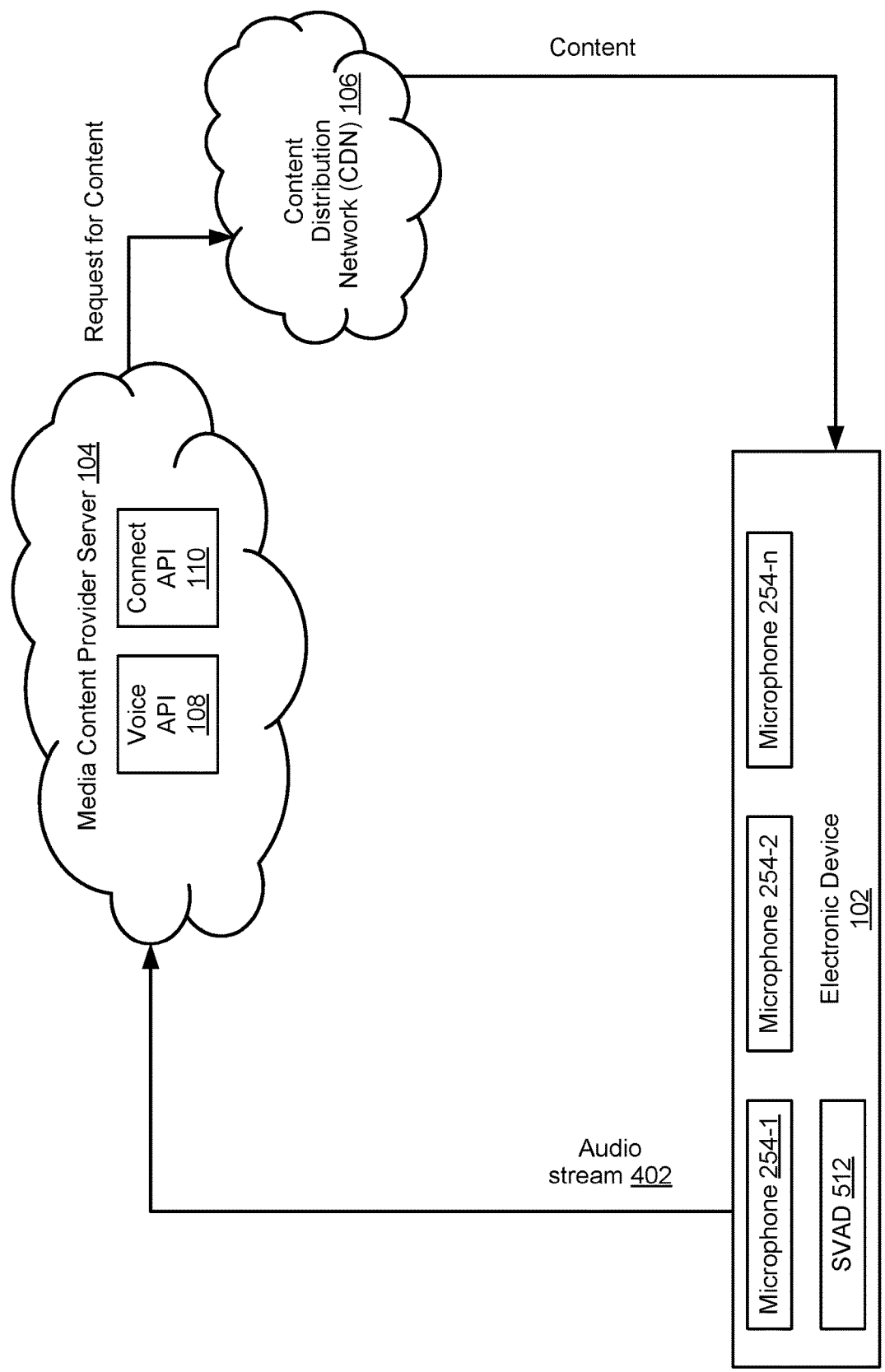
FIG. 4 is a block diagram illustrating a media system architecture for generating a singular voice audio stream, in accordance with some embodiments.

FIG. 4 is a block diagram illustrating a system architecture for generating audio streams corresponding to a plurality of independent voices, in accordance with some embodiments. In the illustrative example of FIG. 4, a set of audio streams corresponding to each of a plurality of microphones is received by an electronic device 102 (e.g., each of the audio streams corresponds to a respective microphone of the plurality of microphones). The set of audio streams, collectively, includes a voice command (e.g., a wake word and, optionally, whatever instructions follow the wake word, such as "play my top hits") as well as cross talk. Each microphone will likely capture the voice command and the cross talk (e.g., chatter from other people) at varying degrees. In some embodiments, the electronic device 102 performs noise suppression, echo cancellation, and beamforming operations on the received audio streams.

In some embodiments, electronic device 102 (e.g., the client device) analyzes the audio streams received from microphones 254 to produce a singular voice audio stream 402 (e.g., corresponding to a human speaker who uttered the voice command). The singular voice audio stream 402 is analyzed by electronic device 102 to detect a wake word (e.g., to determine if the singular voice audio stream included a wake word). In some embodiments or circumstances, if a wake word is detected within the singular voice audio stream 402, the electronic device 102 sends a portion of the singular voice audio stream 402 (e.g., the voice command) to media content provider server 104 (via voice API 108) to determine and provide an appropriate response (e.g., provide content back to electronic device 102). In some embodiments, the portion of the singular voice audio stream that is provided to the media content provider server 104 is delimited by a beginning and end of the voice command, determined based on an analysis of the singular voice audio stream 402, as described herein. In some embodiments, the voice command includes the wake word (e.g., such that the beginning of the voice command is just prior to the wake word). In some embodiments, the voice command does not include the wake word (e.g., such that the beginning of the voice command is just after the wake word).

In some embodiments, frequently-used voice commands are handled by the electronic device 102 without sending the audio of the voice command to media content provider server 104, thus reducing latency. To that end, in some embodiments, the electronic device 102 is configured to analyze and provide a response to a subset of the available voice commands (e.g., common voice commands, such as "play," "pause," "skip" and the like). In such embodiments, electronic device 102 determines whether the voice command is recognizable by the electronic device 102. In accordance with a determination that the voice command is recognizable by the electronic device 102, the electronic device 102 provides a response to the voice command without sending the portion of the singular voice audio stream 402 to the media content provider server 104 for analysis (e.g., the portion delimited by the beginning and end of the voice command, as determined from the singular voice audio stream 402). In accordance with a determination that the voice command is not recognizable by the electronic device 102, the electronic device 102 provides the portion of the singular voice audio stream 402 to the media content provider server 104 for analysis and response.

For example, electronic device 102 may send the voice command "Hey Spotify, play Madonna in the kitchen" to the media content provider server 104, because "play Madonna in the kitchen" is beyond the subset of voice commands that the electronic device 102 is able to handle locally.

In some embodiments, the media content provider server 104 performs various tasks to interpret the voice command, including: converting the voice command (e.g., the audio of the voice command) to text using automatic speech recognition (ASR), processing the text of the voice command using natural language understanding (NLU) (e.g., to interpret the text), and/or a performing a secondary validation/verification of the wake word. In some embodiments, the singular voice audio stream 402 is used (e.g., by the electronic device 102 or the media content provider server 104) to generate a voice filter for the specific speaker which can be used to analyze subsequent voice commands. In some embodiments, the voice filter is used to determine an end of speech (EOS) for subsequent voice commands. End of speech detection is discussed with more detail with regards to FIG. 7.

In some embodiments, the voice command is used by media content provider 104 to generate instructions that are relayed back to the electronic device 102 (e.g., the same electronic device 102-1), a different electronic device 102 (e.g., electronic device 102-m), and/or a CDN 106. In some embodiments, an instruction generated by media content provider server 104 includes or is directed to a target device (e.g., a target device identified in the voice command). For example, in response to receiving a voice command to "Play 'Yesterday' in the kitchen," the media content provider server generates an instruction to initiate playback of the song "Yesterday" at electronic device 102-$m$ (located in the kitchen). In some embodiments, the media content provider server 104 sends an instruction to a first electronic device (e.g., electronic device 102-1) and the first electronic device sends the instruction to a second electronic device (electronic device 102-$m$). In some embodiments, the media content provider server 104 sends the command to a plurality of electronic devices 102 and/or CDN 106. In some embodiments, both electronic device 102-1 and electronic device 102-$m$ are connected to media content provider server 104. For example, electronic device 102-$m$ is a kitchen speaker connected to media content provider server 104 and logged into an account associated with electronic device 102-1 (e.g., a user's cell phone). In some embodiments, in response to receiving a voice command from electronic device 102-1, media content provider server 104 sends instructions directly to electronic device 102-$m$ via connect API 110.

Figure 5:
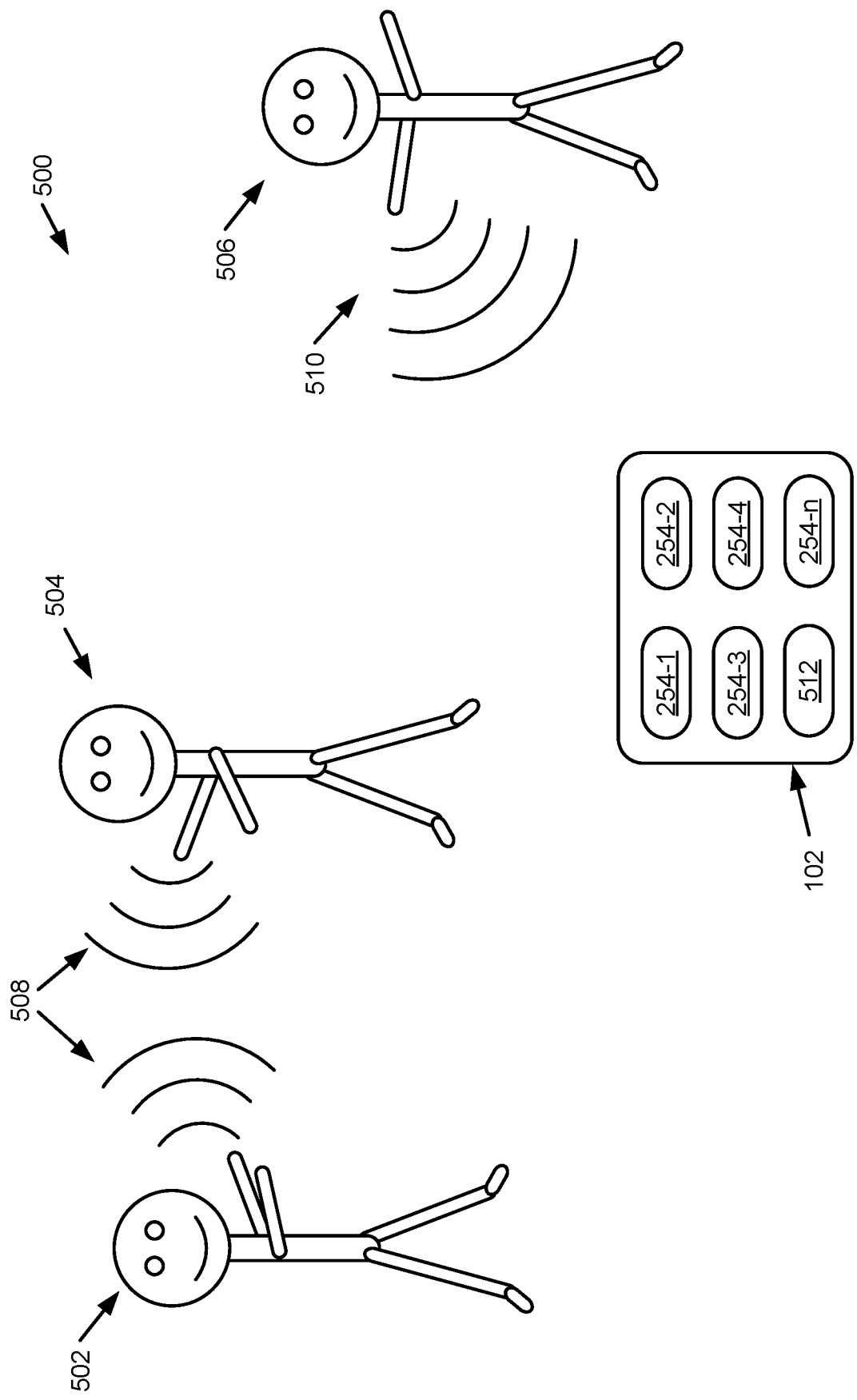
FIG. 5 is a diagram illustrating an exemplary scenario for generating a singular voice audio stream, in accordance with some embodiments.

FIG. 5 is an exemplary illustration depicting a scenario for generating a singular voice audio stream (e.g., a voice audio stream corresponding to a single human speaker providing a voice command), in accordance with some embodiments. More particularly, FIG. 5 depicts an example in which a room 500 includes three people 502, 504, and 506 and an electronic device 102. Electronic device 102 includes multiple microphones 254-1, 254-2, and 254-$n$ at different locations on the electronic device (e.g., a plurality of microphones form a microphone array integrated onto a single device).

Person 506 is speaking to the electronic device 102 and providing a voice command, starting with a wake word (e.g., where the voice command requests performance of an action by the electronic device 102 or a target device). Sound waves 510 emitted from person 506 are received by electronic device 102 at multiple microphones 254. Person 502 and 504 are conversing with each other and emit sound waves 508 that are picked up by electronic device 102 (note that, in some circumstances, the term "audio stream" herein is used to refer to a signal (e.g., electrical signal) representing sound waves). The sound waves 508 are received by microphones 254 and constitute cross-talk in the audio streams. The electronic device then processes the received sound waves 508 and 510 to generate a singular voice audio stream for person 506.

In some embodiments, the process of generating singular voice audio streams is assisted by the use of beamforming. Some examples of suitable beamforming techniques are described in U.S. application Ser. No. 16/787,993, filed Feb. 11, 2020, entitled "Dynamic Adjustment of Wake Word Acceptance Tolerance Thresholds in Voice-Controlled Devices," which is hereby incorporated by reference in its entirety.

As one example, in some embodiments, while people are speaking, the electronic device 102 determines a general direction from which sound is coming from and focuses the microphones 254 to pick up the sound waves (e.g., by repositioning, reorienting, or changing a gain between different microphones to dynamically select different microphones). For example, person 506 is speaking a voice command emitted via sound waves 510. The electronic device uses microphones 254-2 and 254-4 to home in on person 506 and the sound waves 510. Instead of allowing each microphone of the n-number of microphones in electronic device 102 to pick up the sound waves, microphones 254-2 and 254-4 are selected to ensure better audio quality and sound fidelity. In some embodiments, singular voice activity detector (SVAD) 512 is used to separate independent voices within an audio stream. In some embodiments, singular voice activity detector 512 includes voice recognition module 230 and its respective submodules as shown in FIG. 2. The audio stream may include several individual audio streams received at one or more microphones 254. In some embodiments, the electronic device 102 generates individual audio streams corresponding to each speaker. For example, the electronic device 102 produces a first audio stream for person 502, a second audio stream for person 504, and a third audio stream for person 506.

In some embodiments, the electronic device 102 detects a wake word uttered by a person. Expanding on the example given above, the third audio stream for person 506 includes an utterance of a wake word (e.g., "Hey Spotify") to signal that a voice command is to follow. In another example, electronic device 102 detects a beginning of a voice command in the third audio stream for person 506. The electronic device 102 detects a pause in speech in the third audio stream. The electronic device understands the pause to be an indication of an end of speech (EOS). Thereafter, the electronic device performs the voice command. Note that it would be very difficult for the electronic device 102 to detect the end of speech without first producing singular audio voice streams (e.g., individual audio streams corresponding to individual speakers), as the electronic device 102 would otherwise interpret cross-talk as a continuation of the voice command.

In some embodiments, the electronic device 102 detects a wake word uttered by person 506 in the third audio stream. The electronic device sends a portion the third audio stream for further processing to media content provider server 104. The media content provider server 104 performs various analyses to determine the contents of the voice command and sends back to the electronic device 102, instructions for the requested action in response to the voice command.

Figure 6:
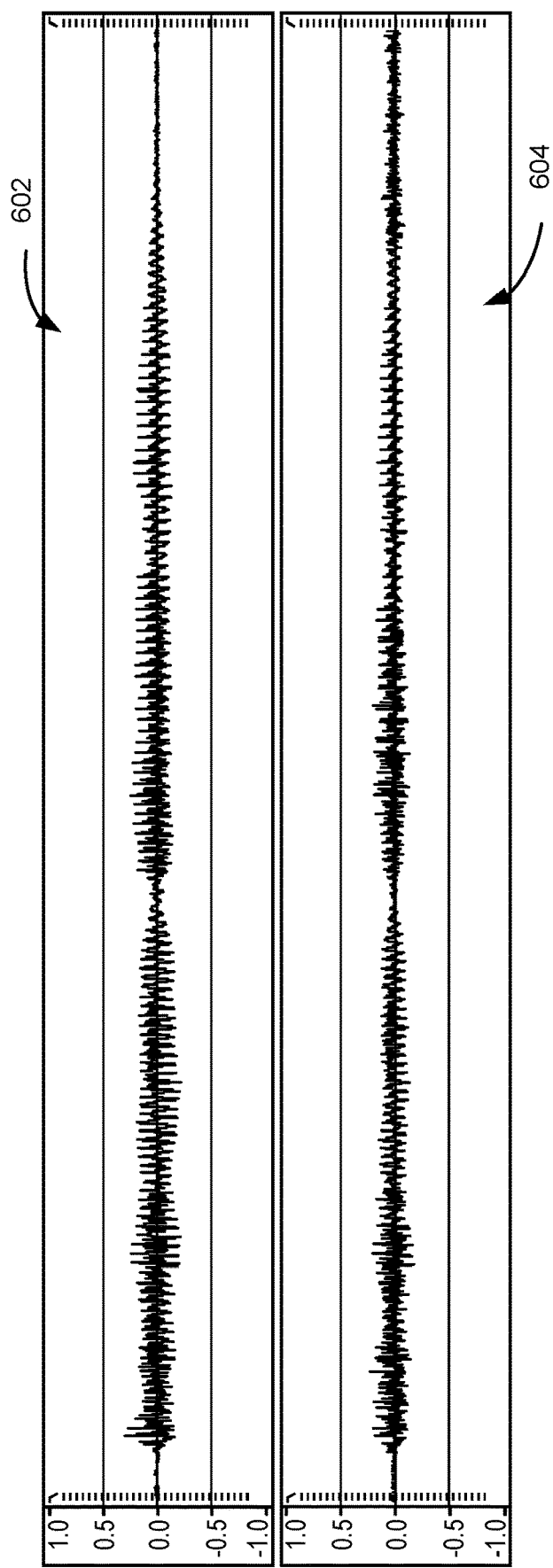
FIG. 6 is a diagram illustrating two audio signals used in generating a singular voice audio stream, in accordance with some embodiments.

FIG. 6 illustrates two distinct audio signals (e.g., audio streams) used to generate a singular voice audio stream in accordance with some embodiments. In this example, signal 602 and 604 are audio streams received from different microphones (e.g., signal 602 is a first audio stream received from a first microphone 254-1 on electronic device 102 and signal 604 is a second audio stream received from a second microphone 254-2 on the electronic device 102). Signals 602 and 604 may include speech from two or more people. The system processes the signals to separate the voices of the speakers into individual signals. In some embodiments, the voices of each speaker for individual audio streams are separated out from signals 602 and 604 by performing independent component analysis (ICA). The electronic device then sends, to a separate server device, a portion of the separated voice stream (shown in FIG. 7). Note that neither signal 602 nor signal 604 includes an obvious end of speech corresponding to a single speaker.

Figure 7:
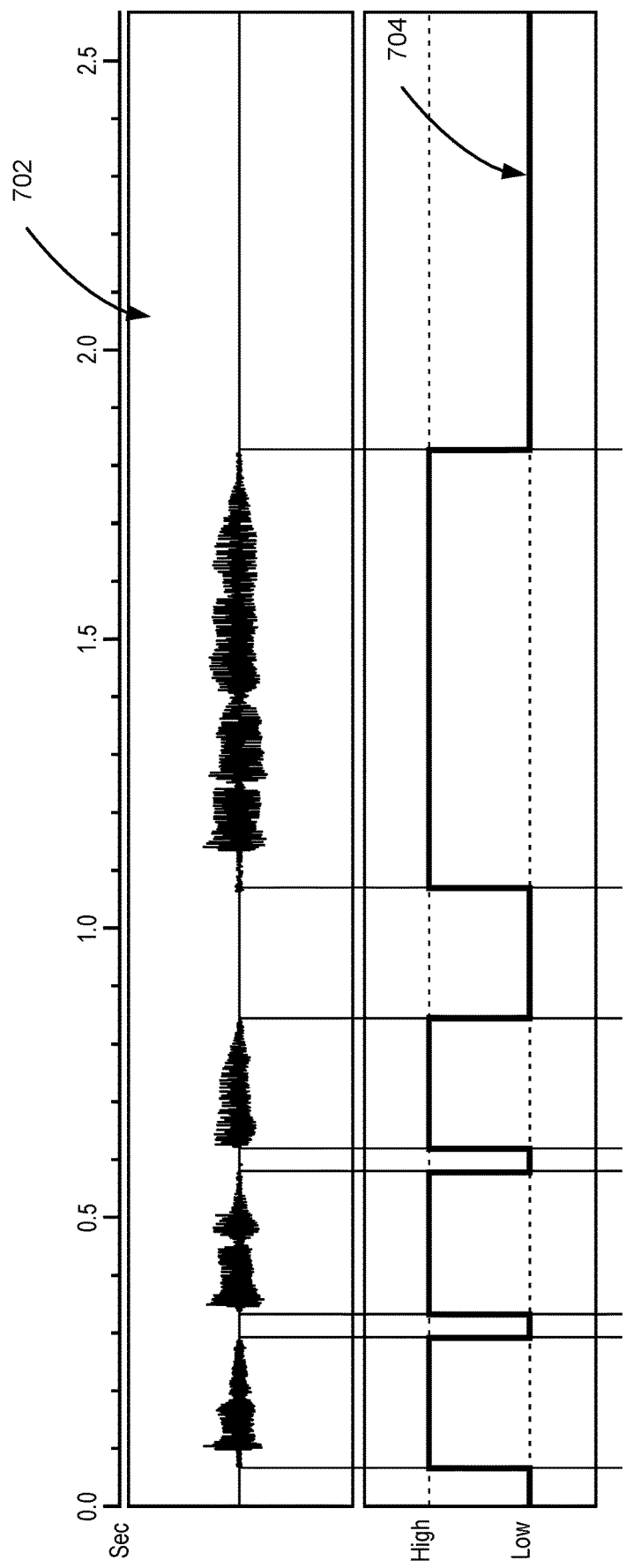
FIG. 7 is an exemplary diagram illustrating a generated singular voice audio stream, in accordance with some embodiments.

FIG. 7 illustrates a generated singular voice audio stream (e.g., signal 702), in accordance with some embodiments. As discussed with reference to FIG. 6 above, signal 702 is an exemplary voice stream for a single human speaker separated from cross-talk, such as speech from other human speakers). In this example, the signal 702 represents the single human speaker saying "Hey Spotify, play Madonna." Signal 702 shows an accompanying timing chart 704 indicating high and low states of the signal 702. In some embodiments, the high and low states shown in timing chart 704 are determined by applying a threshold to signal 702 (e.g., periods of time for which signal 702 contains more than a threshold amount of power are denoted by the high state and periods of time for which signal 702 does not contain more than the threshold amount of power are denoted by the low state). Unlike signals 602 and 604, signal 702 and accompanying timing chart 704 clearly evince pauses in speech (e.g., after each word, followed by a longer pause at the end of the voice command signifying an end of speech). The electronic device processing the signal 702 keeps track of how long the signal remains in the low state. The length of time in the low state is used to determine the end of speech (EOS). For example, when a pause in speech (e.g., represented by the signal 702 being in the low state) exceeds a predetermined threshold (e.g., 0.5 seconds), the electronic device 102 or media content provider server 104 determines that speech (e.g., the voice command) has ended. In some embodiments, the voice command is processed in response to recognizing an end of speech in the singular voice audio stream. Additionally, the length of time in the low state can determine whether the command was issued incorrectly (e.g., the user spoke words that sounded like a voice command, but was in fact, not).

FIGS. 8A-8B are flow diagrams illustrating a method 800 for generating a singular voice audio stream, in accordance with some embodiments. Method 800 may be performed (802) at an electronic device (e.g., electronic device 102) associated with a media-providing service. The electronic device has one or more processors and memory storing instructions for execution by the one or more processors. In some embodiments, the method 800 is performed by executing instructions stored in the memory (e.g., memory 212, FIG. 2) of the electronic device. In some embodiments, the method 800 is performed by a combination of a server system (e.g., including media content provider server 104 and/or CDN 106) and a client electronic device (e.g., electronic device 102). The method 800 improves the electronic device by improving its ability to detect user inputs and, more particularly, the beginnings and ends of wake words and/or voice commands. For example, the electronic device performs faster and/or more accurate recognition of voice inputs by generating a singular voice audio stream blindly separated from irrelevant background noise and speech from other speakers.

Referring now to FIG. 8A, in performing the method 800, the electronic device receives (804) a first set of audio streams corresponding to each of a plurality of microphones. For example, as shown in FIG. 5, electronic device 102 receives multiple audio streams at microphones 254-1 to 254-n. In some embodiments, each audio stream of the first set of audio streams is a representation of sound received by a respective microphone (e.g., the sound recorded by each microphone corresponds to a first audio stream).

In some embodiments, the received audio streams are overlapping in time (e.g., include content that is overlapping in time). In some embodiments, the first set of audio streams are received concurrently. In some embodiments, the audio streams are of the same length. In some embodiments, the audio streams are not of the same length. In some embodiments, additional processing is required to synchronize the length of time to be consistent across each audio stream.

Additionally, an audio stream may include audio from one or more persons who are speaking (e.g., person 502, person 504, person 506, FIG. 5). In some embodiments, the plurality of microphones is dynamically adjusted (808) to produce distinct beamforming arrays. In some embodiments, the electronic device includes the plurality of microphones. In some embodiments, the plurality of microphones comprise a microphone array integrated onto a single device. For example, electronic device 102 includes 4 microphones, one at each corner of its square-shaped body. A user may be speaking from the top right side of the electronic device. Thus, the electronic device focuses the microphones to pick up signals from the top-right microphone rather than from the bottom-left. The microphones receiving audio signals can be dynamically adjusted based on where the input signal is coming from. In some embodiments, the first set of audio streams is received (810) from the beamforming arrays of the dynamically adjusted microphones.

Dynamically adjusting the plurality of microphones to form distinct beam forming arrays aides the process of performing blind separation of sources in speech signals in order to detect a voice command, such as a wake word (e.g., by increasing the extent to which statistically independent signals can be separated from the set of first audio streams, described below).

In some embodiments, the electronic device generates (812) (e.g., via audio stream generator 238) from the first set of audio streams, a second set of audio streams corresponding to each of a plurality of independent voices. In some embodiments, the second set of audio stream includes at least one independent voice (e.g., the voice of a human speaker) and one or more audio streams corresponding to ambient noise). For example, referencing FIG. 5, person 502, and person 504 are engaged in a conversation. A received audio stream (e.g., a first audio stream) may include audio from each of person 502 and 504. The electronic device separates the voice streams of each person (or at least some of the people) to produce the second set of audio streams that includes an audio stream for person 502 and a separate audio stream for person 504. In some embodiments, the electronic device performs (814) a blind source separation on the first set of audio streams to generate the second set of audio streams (e.g., separates the voices of different speakers without the aid of information about what those speakers are saying or where in the room they are located). In some embodiments, the electronic device identifies (816) statistically independent signals in the first set of audio streams to generate the second set of audio streams.

In some embodiments, the electronic device performs (818) independent component analysis (ICA) on the first set of audio streams to generate the second set of audio streams (e.g., ICA is an example of blind source separation, which identifies statistically independent signals in the first set of audio streams). ICA is a computational method for separating a multivariate signal (e.g., such as the set of first audio streams) into additive subcomponents (e.g., such as the second set of audio streams). ICA assumes that the subcomponents (e.g., the speakers' speech) are non-Gaussian signals and that they are statistically independent from each other. ICA finds the independent components (also called factors, latent variables or sources) by maximizing the statistical independence of the estimated components.

In some embodiments, the electronic device detects (820) a wake word (e.g., voice command recognition module 236) in the first audio stream of the second set of audio streams. In some embodiments, the electronic device determines which audio stream of the second set of audio streams includes the wake word (e.g., determines that the first audio stream includes the wake word). For example, referencing FIG. 5, person 506 may utter a wake word (e.g., "Hey Spotify") and, in response to detecting the wake word, the electronic device 102 may transmit, to media content provider server 104, audio that is received after detection of "Hey Spotify," such as a voice command (e.g., "Play," "Pause," "Next track," "Play the song 'Yesterday' in the kitchen," "Play Madonna in the kitchen," etc.).

In some embodiments, the electronic device receives the set of first audio streams and generates the second set of audio streams concurrently. In some embodiments, the second set of audio streams is generated prior to detecting an end of speech (e.g., of the voice command and/or the wake word). For example, in some embodiments, the electronic device generates the second set of audio streams based on a rolling window of a predetermined length (e.g., separates the set of first audio streams into the set of second audio streams for a rolling one second or five second window). In some embodiments, the electronic device performs (822) independent component analysis (ICA) on the first set of audio streams in real-time (or otherwise generates the second set audio streams) using a rolling window having a length of time corresponding to a length of the wake word. For example, while a person is speaking a wake word "Hey Spotify," in a crowded room of other speakers, the electronic device is "listening" for the wake word to be uttered. As the electronic device "hears" the wake word, it performs ICA on the received audio streams to separate the wake word and a subsequent voice command. Additionally and/or alternatively, the electronic device "listens" to the audio in the room for approximately a time required to utter the wake word (e.g., 3 seconds to utter "Hey Spotify"). Thus, the electronic device processes the ongoing, incoming, audio streams in 3 second rolling increments to detect the wake word "Hey Spotify."

Performing independent component analysis (ICA) on the first set of audio streams in real-time (or otherwise generating the second set audio streams) using a rolling window increases the operability of the device by allowing the device to blindly recognize wake words and other voice commands from any of a plurality of speakers, who may be coming and going from the room or engaging in conversations with others when not uttering voice commands.

In some embodiments, the electronic device stores (824) the second set of audio streams (e.g., in voice recognition module 230) corresponding to respective independent voices (e.g., as a training set). In some embodiments, the electronic device generates (826) a voice-specific filter (e.g., filtering module 234) for each of (or one or more of) the independent voices of the second set of audio streams. In some embodiments, the electronic device applies the generated voice specific filter for a respective audio stream of the second set of audio streams corresponding to the independent voice to determine the voice command For example, the electronic device trains a neural network to recognize a respective voice corresponding to one of the second set of audio streams. Storing the second set of audio streams and generating voice-specific (e.g., speaker-specific) filters increases the accuracy of subsequent voice separation, e.g., by reducing the extent to which subsequent voice separation is done "blindly" (e.g., once a person's voice has been detected blindly, knowledge of the characteristics of that person's voice can be used to inform subsequent filtering).

The electronic device detects (828) (e.g., via voice command recognition module 236 and/or wake word module 232) in a first audio stream of the second set of audio streams (i) a beginning of a voice command (e.g., beginning time) to play media content from the media providing service (or request performance of another action with respect to media, such as pausing, skipping to the next track, etc.) and (ii) an end of the voice command (e.g., an end time). The end of the voice command overlaps with speech in a second audio stream of the second set of audio streams. (Note that the voice command may be considered to include the wake word, see operation 820.) In some embodiments, while detecting speech content in a second audio stream of the second set of audio streams, detecting the end of the voice command includes detecting (830) a pause in speech in the first audio stream of the second set of audio streams (e.g., detecting that the first audio stream is in a "low state" for a predetermined amount of time, such as 0.5 seconds, as described with reference to FIG. 7). In some embodiments, the voice command is interpreted based on the beginning and end times of the voice command. For example, a portion of the first audio stream between the beginning and end times is provided to a server to interpret the voice command (e.g., a remainder of the first audio stream is not provided to the server as part of the voice command).

Detecting a beginning and end of the voice command from blindly-separated audio streams avoids interpreting speech from other people as a portion of or continuation of the voice command, which the accuracy and efficiency of voice input recognition. Note that this problem is unique to realm of electronic devices: although humans may have difficulty understanding speech content in a crowded room, humans do not typically have difficulty disambiguating the source of speech (e.g., have difficultly determining that a sentence has ended because another nearby person continues to speak).

Note that, although operation 828 is described above with reference to a voice command to play media content, in various embodiments, the voice command may be a voice command to perform any type of operation by an electronic device. Some of these operations may be operations with respect to media content (play, pause, skip forward, skip backward, etc). Other operations may be to control a thermostat, turn off lights, lock a door, start a car, etc.

In some embodiments, in response to detecting the voice command, the electronic device plays (832) the media content from the media-providing service (or otherwise performs the requested operation, such as pausing, skipping to the next track, etc.). In some embodiments, the electronic device plays the media content at a second, distinct electronic device. Referencing the example above, in response to receiving a voice command to "Play 'Yesterday' in the kitchen," the electronic device generates an instruction to initiate playback of the song "Yesterday" at second electronic device 102-*m* (located in the kitchen).

Although FIGS. 8A-8B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device associated with a media-providing service, the electronic device having one or more processors, and memory storing instructions for execution by the one or more processors:
receiving a first set of audio streams, each audio stream in the first set of audio streams corresponding to a respective microphone of a plurality of microphones, wherein each audio stream of the first set of audio streams includes audio from a plurality of independent voices;
generating a second set of audio streams by performing blind source separation on a rolling window applied to the first set of audio streams, the rolling window having a length of time that captures a wake word, wherein each audio stream in the second set of audio streams corresponds to a respective independent voice of the plurality of independent voices;
detecting, in a first audio stream of the second set of audio streams:
the wake word;
a beginning of a voice command to play media content from the media-providing service; and
an end of the voice command, wherein the end of the voice command overlaps in time with speech in a second audio stream of the second set of audio streams; and
in response to detecting the voice command, playing the media content from the media-providing service.

2. The method of claim 1, wherein:
the plurality of microphones is dynamically adjusted to produce distinct beamforming arrays.

3. The method of claim 2, wherein the first set of audio streams is received from the beamforming arrays of the dynamically adjusted microphones.

4. The method of claim 1, wherein generating the second set of audio streams comprises identifying statistically independent signals in the first set of audio streams.

5. The method of claim 4, wherein generating the second set of audio streams further comprises performing independent component analysis (ICA) on the first set of audio streams.

6. The method of claim 1, wherein generating the second set of audio streams comprises performing independent component analysis (ICA) on each audio stream of the first set of audio streams in real-time.

7. The method of claim 1, wherein:
detecting the end of the voice command includes, while detecting speech content in a second audio stream of the second set of audio streams, detecting a pause in speech in the first audio stream of the second set of audio streams.

8. The method of claim 1, further comprising:
storing, as a training set, the second set of audio streams corresponding to respective independent voices.

9. The method of claim 8, further comprising:
generating a voice-specific filter for each of the respective independent voices of the second set of audio streams.

10. The method of claim 9, further comprising:
applying the generated voice specific filter for a respective audio stream of the second set of audio streams corresponding to the respective independent voice to determine the voice command.

11. The method of claim 1, wherein the electronic device is a first electronic device, and wherein the playing the media content from the media-providing service further comprises playing the media content at a second electronic device distinct from the first electronic device.

12. A non-transitory computer-readable storage medium storing one or more programs configured for execution by an electronic device associated with a media-providing service, the electronic device having one or more processors, the one or more programs including instructions, which when executed by the one or more processors, cause the electronic device to:
receive a first set of audio streams, each audio stream in the first set of audio streams corresponding to a respective microphone of a plurality of microphones, wherein each audio stream of the first set of audio streams includes audio from a plurality of independent voices;
generate a second set of audio streams by performing blind source separation on a rolling window applied to the first set of audio streams, the rolling window having a length of time that captures a wake word, wherein each audio stream in the second set of audio streams corresponds to a respective independent voice of the plurality of independent voices;
detect, in a first audio stream of the second set of audio streams:
the wake word;
a beginning of a voice command to play media content from the media-providing service; and
an end of the voice command, wherein the end of the voice command overlaps in time with speech in a second audio stream of the second set of audio streams; and
in response to detecting the voice command, play the media content from the media-providing service.

13. An electronic device associated with a media-providing service, comprising:
one or more processors; and
memory storing one or more programs, the one or more programs including instructions, which when executed by the one or more processors, cause the electronic device to:
receive a first set of audio streams, each audio stream in the first set of audio streams corresponding to a respective microphone of a plurality of microphones, wherein each audio stream of the first set of audio streams includes audio from a plurality of independent voices;
generate a second set of audio streams by performing blind source separation on a rolling window applied to the first set of audio streams, the rolling window having a length of time that captures a wake word, wherein each audio stream in the second set of audio streams corresponds to a respective independent voice of the plurality of independent voices;
detect, in a first audio stream of the second set of audio streams:
the wake word;
a beginning of a voice command to play media content from the media-providing service; and
an end of the voice command, wherein the end of the voice command overlaps in time with speech in a second audio stream of the second set of audio streams; and
in response to detecting the voice command, play the media content from the media-providing service.

14. The electronic device of claim 13, wherein:
the plurality of microphones is dynamically adjusted to produce distinct beamforming arrays.

15. The electronic device of claim 14, wherein the first set of audio streams is received from the beamforming arrays of the dynamically adjusted microphones.

16. The electronic device of claim 13, wherein generating the second set of audio streams comprises identifying statistically independent signals in the first set of audio streams.

17. The electronic device of claim 16, wherein generating the second set of audio streams further comprises performing independent component analysis (ICA) on the first set of audio streams.

18. The electronic device of claim 13, wherein generating the second set of audio streams comprises performing independent component analysis (ICA) on each audio stream of the first set of audio streams in real-time.

19. The electronic device of claim 13, wherein:
detecting the end of the voice command includes, while detecting speech content in a second audio stream of the second set of audio streams, detecting a pause in speech in the first audio stream of the second set of audio streams.

20. The electronic device of claim 13, the one or more programs further including instructions, which when executed by the one or more processors, cause the device to:
store, as a training set, the second set of audio streams corresponding to respective independent voices.

* * * * *